W. F. MEYERS.
STONE SAW.
APPLICATION FILED JUNE 20, 1912.
1,156,166.
Patented Oct. 12, 1915.
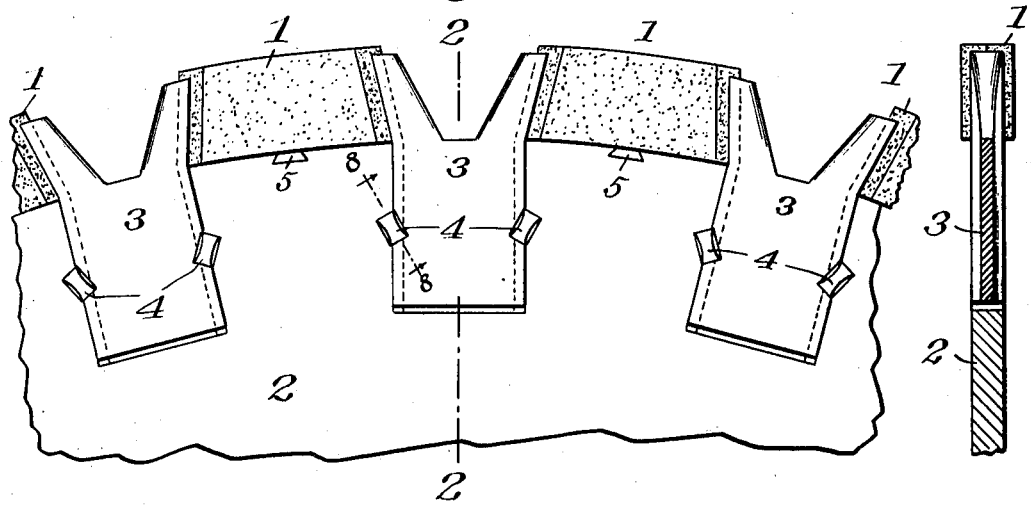
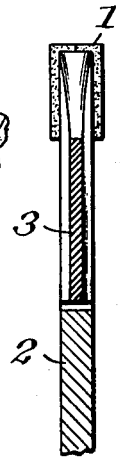
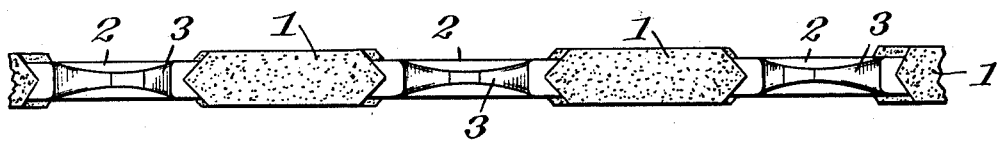
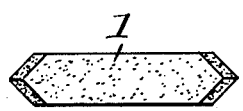
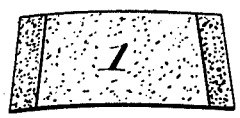
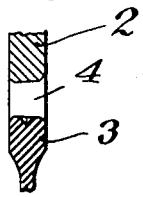
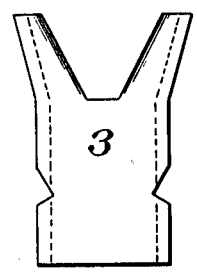
WITNESSES
H. Crockeron
Wm. Ashley Kelly
INVENTOR
Willard F. Meyers
BY
Henry D. Williams
ATTORNEY

UNITED STATES PATENT OFFICE.

WILLARD F. MEYERS, OF LONG ISLAND CITY, NEW YORK.

STONE-SAW.

1,156,166.  Specification of Letters Patent.  Patented Oct. 12, 1915.

Application filed June 20, 1912. Serial No. 704,709.

*To all whom it may concern:*

Be it known that I, WILLARD F. MEYERS, a citizen of the United States, residing at Long Island City, in the county of Queens and State of New York, have invented certain new and useful Improvements in Stone-Saws, of which the following is a specification, reference being had therein to the accompanying drawings, forming part thereof.

My invention relates generally to stone saws and relates particularly to those having teeth consisting of masses of abrasive material, such as of carborundum or the like, and generally known as abrasive teeth. Great difficulty has been experienced in mounting these teeth on the saw blade. Provision must be made for the gradual wearing down of the teeth and also the teeth must be firmly held in such manner as to avoid breaking, as teeth of this nature are comparatively easily broken. It is common, either with or without the use of special holders, to set these teeth in sockets or recesses in the edge of the saw blade in a manner similar to that commonly employed in setting diamond teeth in place, but when abrasive teeth are set in this manner, only that portion of the tooth which projects beyond the edge of the blade can be used, the rest and usually the larger portion of the tooth being wasted. Moreover, the blade is likely itself to be worn in the effort to utilize as much as possible of the material of the abrasive teeth, and it is also to be noted that usually the blades must be specially formed with special tooth-holding recesses or sockets.

The general objects of my invention are inexpensiveness of manufacture, economy of maintenance in working condition, economy of time and labor, in use, a high degree of effectiveness of operation, and durability.

One of the more particular objects of my invention is to enable the application of my invention to ordinary saw blades, such as are commonly employed for holding diamond teeth, without necessitating any changes in the blade, thereby obviating the manufacture of special blades and also enabling the invention to be applied to existing saw blades of this common form, or enabling the same saw blade to be used interchangeably with diamond teeth or with abrasive teeth, as the demands of work to be done may require.

Another object is to enable substantially the whole of an abrasive tooth to be worn away from its outer edge inward, and to do this without injury to the blade or the necessity of readjustment of the tooth.

Another object is to provide adequate clearance spaces for the escape of loose particles or cuttings and for the circulation of a liquid.

Another object is, while accomplishing the preceding objects, to support the teeth in such manner that they will at all times be firmly held and in such manner as to prevent their breaking.

Other objects and advantages of my invention will hereinafter appear.

I shall now describe the stone saw embodying my invention illustrated in the accompanying drawings and shall thereafter point out my invention in claims.

Figure 1 is a side elevation of the upper part of a saw embodying my invention. Fig. 2 is a vertical section of the same on a plane indicated by the line 2—2 of Fig. 1. Fig. 3 is a plan of what appears in Fig. 1. Fig. 4 is a plan or view looking toward the cutting edge of one of the abrasive teeth. Fig. 5 is a side elevation of the same. Fig. 6 is a plan or view looking toward the edge of one of the tooth-holding members or wedges. Fig. 7 is a side elevation of the same. Fig. 8 is a section, enlarged, on a plane indicated by the line 8—8 of Fig. 1 as viewed from the left.

The accompanying drawings illustrate an embodiment of my invention in a stone saw of the circular rotary type, although it is to be understood that my invention could as well be embodied in a saw of the straight or reciprocating type. Abrasive teeth 1 of carborundum or other suitable abrasive material project from the edge of the blade 2 and are mounted on the periphery or outer edge of the blade 2, these teeth being shown as of greater thickness than the blade 2 and being arranged to project substantially an equal distance at opposite sides thereof (Figs. 2 and 3). The blade 2 is provided in its edge with sockets or recesses, such as are commonly provided for the reception of the well known diamond teeth. In fact, a saw blade of the construction commonly employed to hold diamond teeth may be employed in carrying out my invention involving abrasive teeth, without any alteration whatsoever of the saw blade. The abrasive teeth 1 are positioned upon the peripheral edge of the blade 2 and are of a length at their bases to fill the edge spaces between the sockets. The teeth 1 are tapered outward from their bases and from the sockets toward the cutting edges of the teeth and are shown as tapered throughout along straight lines. The bases and the cutting edges of the teeth 1 are shown as curved on circles concentric with the blade 2, the curved bases of the teeth fitting closely against the curved outer peripheral edge surface of the blade, and the tapered ends of the teeth are chamfered and are shown as chamfered along straight lines to form transversely V-shaped ends for the teeth.

Tooth-holding members or wedges 3 are arranged in alternate relation with the abrasive teeth 1. these wedges having shanks or anchor portions anchored or locked in the sockets between the teeth and having tooth-engaging portions projecting beyond the edge of the blade 2 and engaging the tapered portions of the teeth 1 to hold the teeth in position on the blade 2. The wedge-receiving recesses or sockets in the blade 2 have straight V-shaped chamfered side walls parallel or nearly parallel to one another, so that the socket is substantially of rectangular form, this being the usual form of recess or socket for commonly receiving diamond teeth. The shanks of the tooth-holding wedges 3 have edge walls conforming to the sockets so as to be capable of fitting tightly therein, being provided with V-grooves for receiving the chamfered side walls of the sockets or recesses. The projecting tooth-holding portion of any one of the wedges 3 is of bifurcated construction providing two spaced flaring wedge prongs, the inner sides of these prongs being slightly rounded and the outer sides having therein V-shaped grooves forming continuations of the corresponding grooves in the shanks of these members, these V-grooved sides of the prongs engaging the correspondingly chamfered ends of the abrasive teeth 1. The tooth-engaging wedge prongs are shown as terminating a short distance inward from the cutting edges of the abrasive teeth 1 so as to initially expose the cutting edges of the teeth, and, these prongs being of metal, while the teeth 1 are composed of hard, gritty, abrasive material, the prongs will wear down with the teeth, but slightly in advance thereof, so as to always expose the cutting edges of the teeth, and the teeth may be used and will continue to expose effective cuttings edges until substantially the whole bulk of the teeth has been worn away.

The free spaces between the wedge prongs provide ample clearance throughout the depth of the abrasive teeth 1 for the circulation of water or other lubricant and for the escape of loose material or dust-like cuttings, and for the circulation of a liquid abrasive material, and this clearance space is continued below the depth of the abrasive teeth by the hollowing out of the tooth-holding wedges so that they are thinner in their middle portions throughout their depth, being thinner in such middle portions than the thickness of the blade 2. This construction, coupled with the fact that the teeth project laterally beyond the blades, provides ample clearance space for liquid circulation and the escape of loose particles, and provides much more clearance space than is commonly provided merely by having the teeth thicker than the blade.

To assure that the abrasive teeth 1 shall be firmly gripped and held by a strong wedging action, the shanks of the wedges 3 do not extend quite to the bottoms of the wedge-receiving sockets or recesses in the blade (Figs. 1 and 2) and the locking means provided for holding the wedges 3 in these sockets are adapted to firmly and strongly draw the tooth-holding wedges 3 inward. For this purpose, wedge-shaped locking rivets 4 are provided, which may be the usual round rivets. I prefer, however, to employ locking rivets such as are shown, of substantially rectangular cross-section and tapered on two opposite sides, coöperating notches being provided in the blade 2 and in the shanks of the tooth-holding wedges 3, these two notches forming a rectangular rivet-receiving opening, which is disposed at an oblique angle to the meeting faces of the shank of the wedge 3 and of the adjacent wall of the wedge-receiving socket in the blade 2. The tapered sides of the locking rivets 4 engage the outer inclined wall of the notch in the blade 2 and the inner inclined wall of the coöperating notch in the shank of the tooth-holding wedge 3, so that, as the locking rivets 4 are driven into place, they draw the tooth-holding wedges 3 inward into firm wedging contact with the abrasive teeth 1. In a direction transverse to its wedging action, each wedge rivet 4 fits loosely and with some free space in the rivet-receiving opening formed by the above described coöperating notches, thereby permitting the abrasive teeth 1 to be wedged in place without hindrance of the wedging and locking rivets 4 to the tooth-gripping movement of the tooth-holding wedges 3. After the locking rivets 4 have been firmly driven in, they may be locked in place by slightly upsetting their opposite ends, as appears in Fig. 8. Should the heads of these rivets 4 project somewhat, no harm can result, as the thickness of the abrasive teeth 1 over that of the blade 2 provides ample clearance in the kerf cut by the saw. Two wedge rivets 4 are employed for each tooth-holding wedge 3 (Fig. 1).

As a means for holding the abrasive teeth in place when they have been worn down to such thinness that their tensile strength may not be sufficient to hold them together, I provide these teeth with reinforcing projections entering recesses in the edge of the blade. These reinforcements may be in the form of anchors locking the teeth to the blade between the tooth-holding wedges. As shown, one of these anchors 5 is provided at the middle of each abrasive tooth, and it is an adhesive anchor consisting of a mass of material which will firmly adhere to the abrasive tooth and which fills a dovetailed notch in the edge of the blade and is thus held to the blade by reason of its shape.

It is to be noted that each tooth-holding wedge 3, between two teeth, acts to press against and grip these two adjacent teeth, and that each tooth 1 is gripped and held at its opposite tapered ends by two of the tooth-holding wedges 3. The abrasive teeth 1 and the tooth-holding wedges 3 will be worn down together and will be worn out at substantially the same time, and, therefore, all of the abrasive teeth 1 and tooth-holding wedges 3 may be renewed at a single operation.

It is obvious that various modifications may be made in the construction shown in the drawings and above particularly described within the principle and scope of my invention.

I claim:

1. A stone saw comprising a blade having a recess in its edge, an abrasive tooth projecting from the edge of the blade and provided with a tooth-strengthening reinforcing projection entering the said recess and serving to prevent the tooth breaking when it becomes worn, and tooth-holding members on the blade engaging the ends of the tooth and projecting beyond the edge of the blade for wearing down with the tooth.

2. A stone saw comprising a blade having a recess in its edge, an abrasive tooth covering the recess at the edge of the blade and projecting from the edge of the blade, a tooth-reinforcing anchor projecting inward from such tooth and anchored in the said recess to strengthen the tooth against breaking when worn, and tooth-holding members on the blade engaging the ends of the tooth and projecting beyond the edge of the blade for wearing down with the tooth.

3. A stone saw comprising a blade having a recess in its edge, an abrasive tooth covering the recess at the edge of the blade and projecting beyond the edge of the blade, a tooth-strengthening reinforcing anchor adhesively attached to the abrasive tooth and anchored in the recess in the blade to prevent breaking of the tooth when worn, and tooth-holding members on the blade engaging the ends of the tooth and projecting beyond the edge of the blade for wearing down with the tooth.

4. A stone saw comprising a blade, abrasive teeth projecting from the edge of the blade, and a tooth-holding member anchored to the blade and having two spaced tooth-engaging prongs engaging two adjacent abrasive teeth to hold the teeth on the blade and adapted to wear down with the abrasive teeth.

5. A stone saw comprising a blade, abrasive teeth tapered in length from their base portions toward their cutting edges projecting from the edge of the blade, and a tooth-engaging wedge anchored to the blade and having spaced flaring prongs engaging the tapered portions of two adjacent abrasive teeth to hold the teeth on the blade.

6. A stone saw comprising a blade having a series of sockets in the edge thereof, abrasive teeth projecting from the edge of the blade between the sockets, and a tooth-holding member for each socket having an anchor portion set in the socket and having two spaced tooth-engaging prongs one of which engages and holds the tooth at one side of the socket and the other of which engages and holds the tooth at the other side of the socket, the middle portions of such tooth-holding member being thinner than the thickness of the blade.

7. A stone saw comprising a blade having a series of wedge-receiving sockets in the edge thereof, abrasive teeth tapered in length from their base portions toward their cutting edges projecting from the edge of the blade between the sockets, and a tooth-holding wedge for each socket anchored in the socket and having spaced flaring prongs engaging the tapered portions of the two adjacent abrasive teeth to hold the teeth on the blade.

8. A stone saw comprising a blade having a series of wedge-receiving sockets in the edge thereof, abrasive teeth tapered in length from their base portions toward their cutting edges projecting from the edge of the blade between the sockets, a tooth-holding wedge for each socket having a shank portion received into the socket and having tooth-engaging portions engaging the tapered portions of the two adjacent abrasive teeth to hold the teeth on the blade, coöperating notches provided in the side walls of the sockets and in the shank portions of the wedges, such notches forming substantially rectangular rivet-receiving openings disposed obliquely to the meeting faces of the shanks of the wedges and of the walls of the sockets, and wedge-shaped rivets fitting in such openings and adapted to draw the tooth-holding wedges inward into firm wedging contact with the tapered portions of the abrasive teeth.

9. A stone saw comprising a blade having a series of sockets in the edge thereof, abrasive teeth projecting from the edge of the blade between the sockets, and a tooth-holding member for each socket engaging two adjacent abrasive teeth to hold the teeth on the blade and having an anchor portion set in the socket and extending inward beyond the teeth, the middle longitudinal portions of such tooth-holding member being thinner than the thickness of the blade.

10. A stone saw comprising a blade having a series of sockets in the edge thereof, abrasive teeth projecting from the edge of the blade between the sockets, and a tooth-holding member for each socket engaging two adjacent abrasive teeth to hold the teeth on the blade and having an anchor portion set in the socket and extending inward beyond the teeth, such tooth-holding member being hollowed out longitudinally so that its middle portions are thinner than its edge portions and also thinner than the thickness of the blade.

11. A stone saw comprising a blade having a series of sockets in the edge thereof, abrasive teeth thicker than the blade projecting from the edge of the blade between the sockets, and a tooth-holding member for each socket thinner throughout than the teeth having a shank anchored in the socket and having a tooth-holding portion bifurcated to form spaced tooth-holding prongs engaging adjacent abrasive teeth to hold the teeth on the blade.

12. A stone saw comprising a blade having a series of sockets in the edge thereof, abrasive teeth projecting from the edge of the blade between the sockets, and a tooth-holding member for each socket having a shank anchored in the socket and having a tooth-holding portion bifurcated to form spaced tooth-holding prongs engaging adjacent abrasive teeth to hold the teeth on the blade, the middle longitudinal portions of such tooth-holding member being thinner than its edge portions.

13. A stone saw comprising a blade, abrasive teeth tapered in length throughout from their bases to their cutting edges projecting from the edge of the blade, the blade having sockets in its edge between adjacent teeth, and a tooth-holding wedge having a shank anchored in the socket and having spaced flaring prongs respectively engaging such adjacent teeth from their bases outward and adapted to wear down with the teeth.

14. A holding member for abrasive teeth of stone saws, such member having a shank for anchoring the member in place on a saw blade, and having spaced tooth-holding prongs projecting from the shank for engaging adjacent teeth.

15. A holding member for abrasive teeth of stone saws, such member having a shank for anchoring the member in place on a saw blade, and having spaced tooth-holding prongs projecting from the shank and flared outwardly for engaging adjacent teeth, the middle longitudinal portions of such tooth-holding member being thinner than its edge portions.

In testimony whereof I have affixed my signature in presence of two witnesses.

WILLARD F. MEYERS.

Witnesses:
HENRY D. WILLIAMS,
BERNARD COWEN.